June 29, 1926.

H. IZARD

SPRING RETARDER

Filed August 1, 1925

INVENTOR.
Henry Izard
BY E. E. Overholt,
ATTORNEY.

Patented June 29, 1926.

1,590,691

UNITED STATES PATENT OFFICE.

HENRY IZARD, OF MOBILE, ALABAMA.

SPRING RETARDER.

Application filed August 1, 1925. Serial No. 47,513.

My invention relates to spring retarders for land vehicles.

My object is to provide a device of this character specially adapted to regulate the upward rebound of automobile and truck springs.

As is well known, the downward yielding of the springs absorbs the shock of the load that would otherwise be imposed upon the chassis of the vehicle when obstructions in the road, or irregularities in the roadbed are passed over; but when the springs recoil from their downward movement, the body of the vehicle is often thrown violently upward, sometimes with a force that almost lifts the vehicle off the ground. This causes the load of the vehicle, whether it be persons or things, to be bounced upwardly in a most objectionable manner, which is rendered all the more objectionable by reason of the fact that the upward toss of the body is instantly followed by a downward jerk. This upward movement just described imposes a heavy strain on the springs in the direction of their least power of resistance, and for the time, lessens the traction power of the wheels by lessening their frictional contact with the ground.

The above objectionable features of ordinary springs causes bolts and nuts to work loose, and lessens the life of the vehicle to a very considerable degree.

Another object of my invention is to so arrange my device that while regulating the upward rebound of the springs, it will in no way interfere with their regular downwardly yielding movement.

Minor objects will appear in the subjoined description.

An important feature of my invention consists of a movable disc actuated by the pressure of an air-tight rubber bag adapted to be inflated to any desired degree proportionate to the rebound to be resisted.

The invention consists in certain novel features of construction and arrangements of parts, as will be hereinafter described and claimed, reference being had to the accompanying drawings, in which:—

Figure 1:
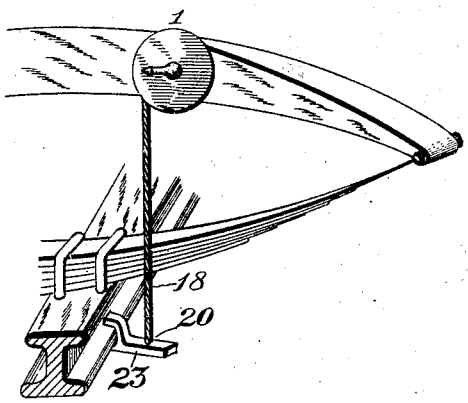
Fig. 1 is a broken perspective showing one of my devices attached in operative position on a vehicle spring.
Figure 2:
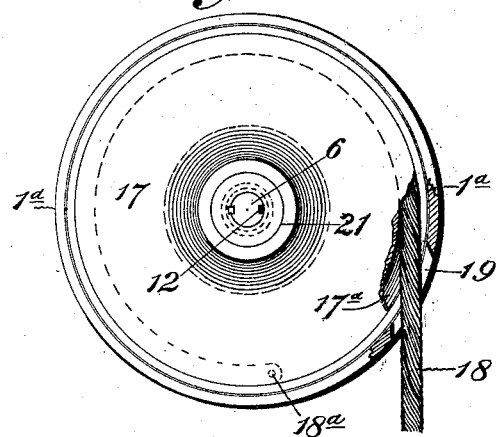
Fig. 2 is a side elevation of the device, with the cover removed.
Figure 3:
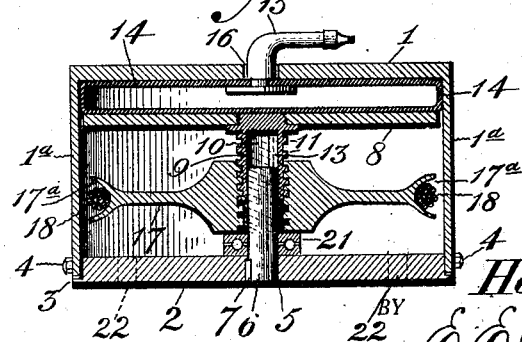
Fig. 3 is a sectional view.

Referring further to the drawings, the numeral 1 indicates a casing having cylindrical side walls 1ª, and a cover 2 provided with a slight peripheral offset 3, and held on the casing 1 by means of bolts 4. The cover 2 has a central opening 5 which carries a pin 6 held rigidly therein by means of a key 7. Adjacent the bottom of the casing 1 is a disc 8 which forms a piston movable toward and from said bottom; and rigidly secured to this disc is a hollow standard 9 with its central opening 10 adapted to receive the pin 6 for longitudinal movement therein, and externally threaded as at 11. The pin 6 has a longitudinal keyway 12 and the standard 9 carries a key 13 adapted for longitudinal movement in the keyway 12, so that the standard 9 is held against rotatable movement on the pin 6, though free to move longitudinally thereon. Of course the key 13 can be carried by the pin 6, if preferred, as that is simply a matter of mechanical preference.

In the space between the disc or piston 8 and the bottom of the casing 1, is an air-tight rubber bag 14 which is supplied with an ordinary air valve 15 for inflating the same. This valve extends out through a central opening 16 in the bottom of the casing.

Mounted on the standard 9 is a pulley 17 axially threaded thereon for free co-operation therewith. This pulley is provided with an annular peripheral groove 17ª in which is carried a small cable 18, suitably secured at one end to the pulley as at 18ª, and having its other end extending out through an opening 19 in the circular wall 1ª of the casing, to be connected at its lower end to the axle of the vehicle as indicated at 20. Mounted on the pin 6 between the cover 2 and the hub of the pulley 17 is the thrust bearing 21.

The plate 2 is provided with a suitable number of openings 22 for securing the device in operative position on the vehicle frame.

In operation, the device is secured preferably to the upper portion of the spring, as illustrated in Fig. 1, with the cord or cable 18 extending downwardly and connected by suitable means 23 to the axle of the vehicle. There may be one retarder for each spring, if so desired, or there may be only one for each end of the vehicle. The rubber bag 14 is inflated with air in substantially the same way as is the inner tube of an automobile tire. This imparts a powerful tendency to the disc 8 and the standard 9 to move outwardly on the pin 6; and as the key 13 prevents said standard and pin from rotatable movement relatively to each other, the threads on the standard 9 are thrust forcibly outward in engagement with the cooperating threads of the pulley 17, and the pitch of these cooperating threads is such as to cause said pressure to rotate the pulley 17, which in turn causes the pulley to take up the slack in the cable 18 as the spring of the vehicle is depressed. As the upper section of the spring moves upwardly on its return movement, the cable is of course withdrawn again which rotates the pulley 17, and through the threaded standard 9 forces the disc 8 inwardly against the inflated rubber bag 14, which offers resistance to said inward movement of the disc 8, and through it to the return movement or upward rebound of the spring. The amount of resistance is regulated by the amount of inflation of the bag. But however great the inflation of the bag may be, it does not in any way prevent the free downward movement of the spring. The thrust bearing 21 relieves the pulley 17 of any objectionable degree of frictional contact with the cover 2 of the device. Hence it will be seen that I have provided a device of great simplicity and durability, with very few parts, no one of which is liable to get broken or out of order, the device being withal, admirably adapted for the purpose for which it is intended.

Having now described my invention, what I claim as new and desire to protect by Letters Patent is:—

1. In a device of the character described, the combination with the frame and axle, of a flexible connection between said parts for resisting the movement of said parts in a direction away from each other; a pulley rotatably mounted on one of said parts with one end of the flexible connection wound around said pulley, and the other end of the flexible connection secured to the other of said parts; a compressed air chamber having a movable wall; a rubber bag mounted in said chamber and adapted to press against said wall; a threaded standard movable with said wall, said pulley having threaded bearing on said standard and adapted to be rotated by the movement of the standard toward the pulley, whereby to impart a yielding tension to the flexible connection.

2. A device of the character described, comprising a flexible member for connecting the frame and axle to yieldingly resist the movement of said parts in a direction away from each other; a pulley adapted to be rotatably mounted on one of said parts of the spring with one end of the flexible connection wound around said pulley, and the other end of the flexible connection adapted to be secured to the other one of said parts; a compressed air chamber having a movable wall; a threaded standard movable with said wall, said pulley having threaded bearing on said standard and adapted to be rotated by the movements of the standard toward the pulley, to impart a yielding tension to the flexible connection.

3. A device of the character described, comprising a casing adapted to be secured to one of the sections of a vehicle spring; a cover for the casing rigidly secured thereto; a rigid guide pin extending inwardly from the cover; a movable disc adjacent the opposite side of the casing from the cover; a compressed air bag between said disc and said side of the casing; a hollow standard rigidly mounted on said disc and having guided longitudinal movement on said rigid pin toward and from the cover, said standard being externally threaded; a pulley rotatably mounted on said standard, said pulley having an axial opening threaded to cooperate with the external threading of said rigid standard; a thrust bearing received upon said fixed pin between said pulley and the rigid cover of the casing; a cable having one end wound upon said pulley and its other end adapted to be secured to the other section of the spring, the casing having an opening for the free passage of the cable therethrough; and means for inflating the rubber bag in the casing.

In testimony whereof I affix my signature.

HENRY IZARD.